Dec. 27, 1949     R. F. HAYS, JR     2,492,863
MODULATOR CIRCUIT
Filed June 11, 1947
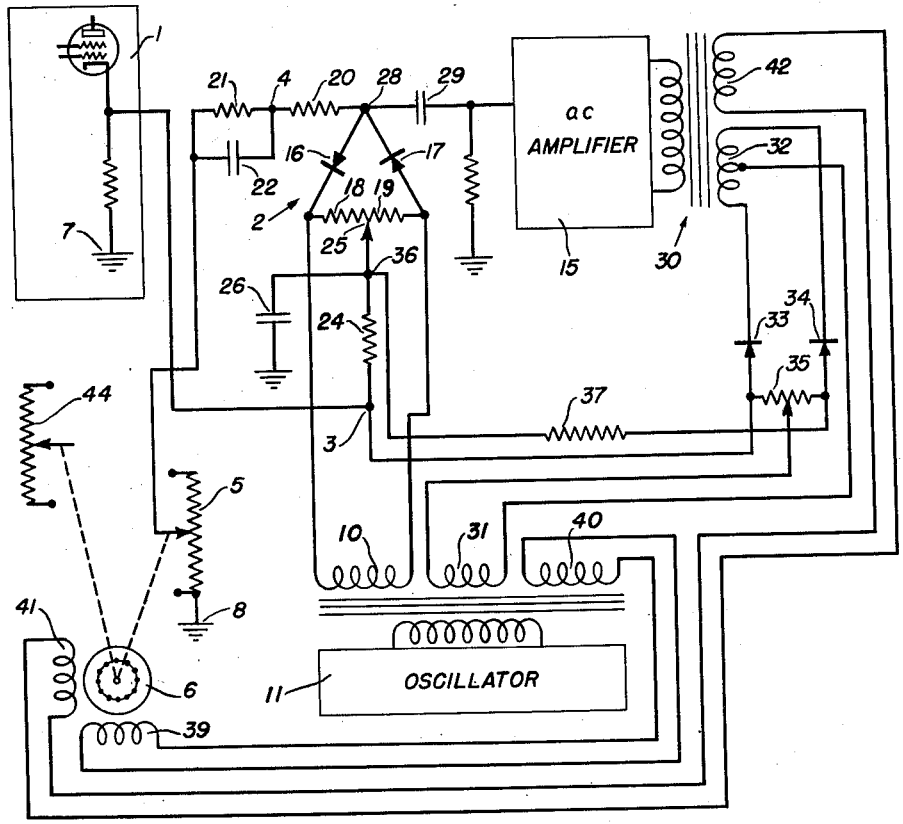
FIG 1
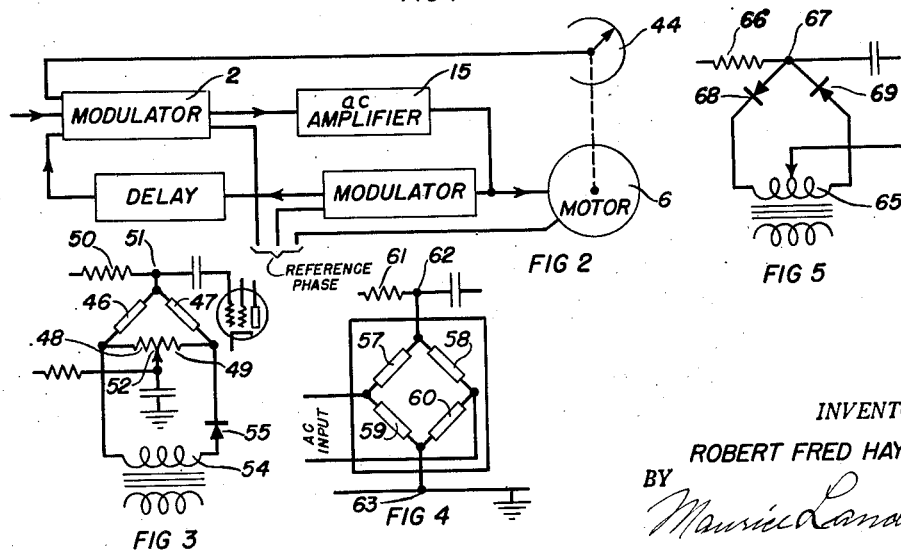
INVENTOR.
ROBERT FRED HAYS, JR.
BY Maurice Landure Patented Dec. 27, 1949

2,492,863

UNITED STATES PATENT OFFICE 2,492,863

MODULATOR CIRCUIT

Robert Fred Hays, Jr., Syosset, N. Y., assignor to Specialties, Inc.

Application June 11, 1947, Serial No. 754,008

13 Claims. (Cl. 318—28)

1

The present invention has for an object to provide an effective circuit for introducing into a computer or into an instrument a voltage such as may be derived from an instrument responsive to a change of condition.

The invention has been developed more particularly in the production of a servo amplifier circuit for introducing into a computer a voltage representing the altitude as indicated by a radio altimeter and for convenience of description such a circuit will be described for the purposes of illustrating the principles of the invention.

The invention has for one of its objects to provide a circuit using power from an A. C. source to amplify a low voltage signal derived from a sensitive instrument responsive to a change of condition.

Another object is to provide an amplifying circuit whereby upon a change of the condition measured a strong impulse may be transmitted to the servomotor and immediately thereafter or after a short interval the amplification may be very much reduced.

The circuit shown for the purposes of illustration includes a modulator and an amplifying circuit whereby a very low D. C. control voltage is combined with power from an A. C. source, the result of which is fed into an amplifier and a follow-up motor is controlled by the output of the amplifier to introduce the corresponding factor into a computer or the like. As an alternative additional provision a delayed degenerative feedback operates after a short interval to reduce the gain of the circuit.

The nature and objects of the invention will be better understood from a consideration of the description of an illustrative circuit selected for the purposes of illustrating the principles of the invention. Referring to the drawing, Figure 1 is an electrical diagram of a circuit involving the principles of the invention.

Fig. 2 is a diagram showing the arrangement of the units of the circuit.

Figs. 3, 4, and 5 show modifications of certain portions of the circuit.

The servo amplifier herein described and shown in the drawing has been designed more particularly to introduce into a bombing computer as a factor a voltage corresponding to the altitude as indicated by the output voltage of a radio altimeter but the circuit is obviously adaptable for other uses. The principal object of the circuit is to provide a servo control which will respond quickly to variations of voltage from the radio altimeter but in which overrunning and

2 hunting will be reduced to a minimum. The circuit provides particularly a modulator or chopper by the employment of which the difference of voltage between that derived from an altimeter and that derived from a follow-up potentiometer in a servo unit is suitably applied at the input of an amplifier. The circuit shown provides also a delayed feedback from the output of the amplifier to the modulator or chopper introducing a phase lead in order to reduce hunting.

The operation of the circuit to produce an A. C. output of a voltage and phase suitably representative of the D. C. input depends upon the cyclical variation of the incremental resistance of the varistors impeding D. C. flow whereby the D. C. voltage will cause A. C., or pulsing, output voltage.

An impedance to A. C. which passes D. C. is included in at least one D. C. input lead whereby an effective A. C. is available for amplification.

Referring to the electrical diagram, Figure 1, a radio altimeter 1, such, for example, as an APN-1 altimeter supplies a voltage varying with altitude to the modulator or chopper 2 at the input point 3. A comparison voltage is delivered to the modulator at the input point 4 from a potentiometer 5 driven by the servomotor 6. The altimeter circuit and the circuit of the resistance 4 are grounded as indicated at 7 and 8, so that the inputs to the modulator from the altimeter and potentiometer constitute a D. C. source to pass current through the modulator. The modulator receives an A. C. power supply from a coil 10 of the output transformer of a 400 cycle oscillator 11.

The modulator thus receives A. C. voltage from a power source and a D. C. control voltage and is arranged to deliver an A. C. voltage to the amplifier 15. In principal, the modulator comprises a balanced bridge circuit with A. C. power voltage applied at the ends of the bridge and the D. C. control voltage applied across the bridge to produce an A. C. output of a voltage corresponding to the D. C. control voltage and of a phase depending upon the polarity of the D. C. voltage. The illustrative bridge circuit includes two varistors 16, 17, connected in series with each other between the A. C. input leads together with resistances 18, 19, in series with each other and in parallel with the varistors 16 and 17. In operation the incremental resistances of the varistors is varied cyclically by the alternating current to cause a pulsing or alternating current between the D. C. leads. In order that an A. C. voltage may be delivered effectively to the amplifier 15 an impedance to A. C. which will pass D. C. as indicated at 20 is included in the D. C. lead from the potentiometer 5. An antihunt circuit comprising resistance 21 and condenser 22 is also included in this lead. A resistance 24 is preferably included in the D. C. lead from the altimeter. This resistance in combination with condenser 26 smoothes the signal received from the altimeter and acts to delay the feedback signal.

In order that any difference between resistances of the varistors 16 and 17 may be suitably compensated to balance the bridge circuit, the resistances 18 and 19 are constructed as one unit and contact 25 is adjustable along such resistance. Contact 25 is grounded for A. C. through the condenser 26 thus making suitable provision for electrical circuit connection to the amplifier also grounded.

Preferably, provision is made whereby the incremental resistance of the varistors will be increased during one-half cycle and reduced during the other half cycle of the A. C. power voltage. This reduces the frequency of the modulator output to one half of what it would otherwise be. Such provision may be made by suppressing one half cycle of the A. C. so far as its effect on the resistance of the varistors is concerned. In the circuit shown in the electrical diagram, Figure 1, the varistors are made rectifiers to accomplish this object. In the operation of the circuit the incremental resistance of the varistors 16 and 17 will be greatly reduced during one half cycle whereby direct current will flow with little resistance through both varistors in parallel but during the other half cycle the incremental resistance will be increases practically to infinity. The resulting pulsing or alternating voltage output taken at the common point 28 between the varistors 16, 17 and the impedance 20 will be proportional to the D. C. voltage and will be in phase with or in phase opposition to the A. C. input depending upon the polarity of the D. C. input. The output of the modulator is amplified to provide control of the servo motor 6. Preferably, but not necessarily, a blocking condenser 29 is introduced between the modulator output lead and the amplifier.

The amplifier 15 is conventional and need not be shown except to indicate the output transformer 30.

In order to improve the stability of the servo system the modulation envelope of the signal applied to the motor is made to phase lead the altitude error. For this purpose a delayed inverse feedback circuit is provided by which the feedback voltage may be impressed upon the modulator after a predetermined delay. As shown A. C. from the secondary coil 31 of the oscillator 11 is combined with A. C. from the secondary coil 32 of the transformer 30 through the modulator circuit including rectifiers 33 and 34 and resistance 35 to deliver a suitable direct current to the modulator at the points 3 and 36 which will oppose the voltage from the altimeter. It is to be noted that when the voltage from the altimeter is higher than that from the servo potentiometer the feedback current applied during the effective half cycle is negative to reduce the effective voltage difference and when the voltage from the altimeter is lower the feedback voltage during the effective half cycle is positive to, in effect, reduce the voltage difference. This degenerative feedback voltage is delayed by means of series resistance 37 and a shunt condenser 26 so that the modulation envelope of the amplifier output will phase lead the input signal. The condenser 26 serves as the shunt condenser of this circuit since point 3 is effectively grounded so far as the feed back circuit is concerned because of the extremely low impedance of the signal source 1.

Servo-motor 6 is driven by a fixed phase current delivered to the coil 39 from the secondary coil 40 of the oscillator and a variable phase current delivered to the coil 41 from the coil 42 of the transformer 30.

By the described arrangement, a sudden change of voltage from the altimeter will have its effect through the modulator and amplifier circuit to cause an instantaneously high current from the coil 42 of the transformer 30 to pass to the motor of the servo unit but the feedback circuit will cause this quickly to be reduced.

In other words, we have a high starting torque applied to the motor but this torque is immediately reduced as the delayed inverse feedback takes effect. This compensates for the time constant of the motor and results in smoother performance of the servo. It practically eliminates overshooting and hunting. It will be understood that the feedback circuit is added as a variation permitting the control circuit to be designed with a different set of constants than when the feedback is omitted.

The potentiometer of the bombing computer circuit served by the circuit herein described is indicated at 44.

In the modifications shown in Figs. 3, 4, and 5 the bridge circuits are essentially the same, with the A. C. input applied across the bridge in one direction and the D. C. input applied transversely, the A. C. output being taken from the point of connection of the D. C. leads.

In the circuit of Fig. 3, two varistors 46, 47 are connected in series with each other and in parallel with the two resistances 48, 49, between the A. C. power leads while the D. C. input leads are connected one through impedance 50 to the point between the varistors and the other to an opposite point of the bridge which is the point between the resistances, the A. C. being taken from the common point of connection 51 between the impedance and varistors and an opposite point of the bridge as at 52 and applied to the amplifier. The A. C. power is supplied from the secondary transformer coil 54. Rectifier 55 suppresses one half cycle of the A. C. In the arrangement of Fig. 4 the bridge circuit comprises four varistors 57, 58, 59, 60. The A. C. input is applied across the bridge in one direction and the D. C. input is applied through an impedance 61 and transversely of the bridge. The A. C. output leads are also connected transversely at the points 62, 63 in the second direction. In Fig. 5, the arrangement is essentially similar but the connections are simplified. An A. C. voltage is supplied by the transformer secondary coil 65 and the D. C. input leads are connected one through resistance 66 to the point 67 between the rectifiers 68, 69, and the other at the opposite point of the bridge which is the center point of the coil 65.

The foregoing particular description of a selected embodiment is illustrative merely and is not intended as defining the limits of the invention. Obviously various modifications can be made and various equivalents can be substituted, as for example, vacuum tube rectifiers for the crystal rectifiers indicated in the drawing.

I claim:

1. In an electrical control circuit of the character described, the combination with a servo-motor and a potentiometer controlled by the servomotor of a direct current control voltage source, an alternating current power source, a modulator connected to receive direct current from between the potentiometer and the direct current control voltage source and to receive alternating current from the alternating current power source and arranged to deliver alternating current in phase with or in phase opposition to the alternating power current as the control voltage is of higher or lower voltage than that of the potentiometer, an amplifier circuit connected to receive and amplify the alternating current delivered by the modulator, an amplifier output circuit arranged to control the servomotor, a second amplifier output circuit, and a degenerative feedback circuit including a second modulator connecting to the alternating power source and to the second amplifier output circuit to deliver the direct current to the first mentioned modulator of voltage opposing the voltage of the input of the first mentioned modulator together with means for delaying the feedback current.

2. In a circuit of the character described, the combination with a constant A. C. power source, a variable D. C. control source and an A. C. amplifier, of a modulator circuit comprising a bridge circuit having two varistors connected in series between the A. C. power leads, two resistances connected in series with each other and in parallel with the varistors between the A. C. power leads, an A. C. impedance which will pass D. C. connected to the common point between the varistors, one D. C. lead being connected to the impedance and through it to the varistors, the other D. C. lead being connected to the common point between the two resistances, said point being effectively grounded for the A. C. power frequency either directly or by means of a capacitor, and a connection from the common point between the varistors serving as the output terminal to the amplifier.

3. In an electrical circuit of the character described the combination with a constant A. C. power source and a variable D. C. control source, of a modulator circuit comprising a balanced bridge circuit including two varistors connected in series between the A. C. power source leads, the D. C. leads being connected one to the common point between the varistors and the other to an opposite point of the bridge circuit, and an A. C. output circuit connected to the bridge circuit at the points of connection of the D. C. leads.

4. In an electrical circuit of the character described the combination with a constant A. C. power source, a variable D. C. control source, and an amplifier of a modulator circuit comprising a balanced bridge circuit including two varistors connected in series between the A. C. power source leads, an A. C. impedance which passes D. C. connected to the common point between the varistors, one D. C. lead being connected to the impedance and the other being connected to an opposite point of the bridge circuit and an A. C. output circuit leading to the amplifier, one lead being connected to the bridge circuit at the common point between the varistors and the impedance and the other being connected to an opposite point of the bridge circuit.

5. In an electrical circuit of the character described the combination with a constant A. C. power source and a variable D. C. control source, of a modulator circuit comprising a balanced bridge circuit including two varistors connected in series between the A. C. power source leads, an A. C. impedance which passes D. C. connected to the common point between the varistors, one D. C. lead being connected to the impedance and the other being connected to an opposite point of the bridge circuit, a rectifier included in one of the A. C. leads, and an A. C. output circuit, one lead being connected to the bridge circuit at the common point between the varistors and the impedance and the other being connected to an opposite point of the bridge circuit.

6. In an electrical circuit of the character described the combination with a constant A. C. power source and a variable D. C. control source, of a modulator circuit comprising a balanced bridge circuit including two varistors connected in series between the A. C. power source leads, an A. C. impedance which passes D. C. connected to the common point between the varistors, one D. C. lead being connected to the impedance and the other being connected to an opposite point of the bridge circuit, means for suppressing one half cycle of the A. C. through the varistors, and an A. C. output circuit, one lead being connected to the bridge circuit at the common point between the varistors and the impedance and the other being connected to an opposite point of the bridge circuit.

7. In an electrical circuit of the character described the combination with a constant A. C. power source, a variable D. C. control source, and an amplifier, of a modulator circuit comprising a balanced bridge circuit including two varistors connected in series between the A. C. power leads, an A. C. impedance which passes D. C. connected to the common point between the varistors, one D. C. lead being connected to the impedance and the other being connected to an opposite point of the bridge circuit, and an A. C. output, one lead of which is connected to the common point between the varistors and the A. C. impedance, the other lead being connected to the D. C. circuit.

8. In a modulator circuit of the character described the combination with a constant A. C. power source, a variable D. C. control source, and an amplifier of a modulator comprising a bridge circuit including two rectifiers connected in series with each other between the A. C. leads, two resistances connected in series with each other and in parallel with the rectifiers between the A. C. leads and an A. C. impedance which will pass D. C. connected to the common point between the rectifiers, one D. C. lead being connected to the A. C. impedance, the other D. C. leading being connected to the opposite point of the bridge circuit, and an output leading from the point between the rectifiers and an opposite point of the bridge to the amplifier.

9. In a modulator circuit of the character described the combination with a constant A. C. power source, a variable D. C. control source, and an amplifier of a closed circuit comprising two rectifiers connected in series with each other between the A. C. leads, two resistances connected in series with each other and in parallel with the rectifiers between the A. C. leads, one D. C. lead being connected to the closed circuit between the two rectifiers, the other D. C. lead being connected to the closed circuit between the two resistances, an A. C. impedance which will pass D. C. included in the D. C. source which is connected to the first mentioned D. C. lead, a condenser connected between the second mentioned D. C. lead and ground, whereby a pulsing D. C. current flows between the D. C. leads, and a connection between the first mentioned D. C. lead and the amplifier.

10. In an electrical control circuit of the character described, in combination, a D. C. control voltage source, an A. C. power source, a modulator comprising a balanced bridge circuit including two rectifiers connected in series between the leads of the A. C. power source and an impedance which will pass D. C. connected to the bridge circuit between the two rectifiers, one D. C. lead being connected to the said impedance, the other D. C. lead being connected to an opposite point of the balanced bridge circuit, an A. C. output being taken from the common point between the two rectifiers and the first mentioned impedance and an opposite point of the balanced bridge circuit.

11. In a modulator circuit the combination with a constant A. C. power source, a variable D. C. control source, and an amplifier circuit, of a bridge circuit, one side of which comprises two rectifiers connected in series between the A. C. leads, the other side of which comprises two resistances connected in series between the A. C. leads and in parallel with the rectifiers, an A. C. impedance which will pass D. C. connected to the common point between the rectifiers, the D. C. leads being connected one to the impedance, the other to the common point between the resistances, A. C. output leads connected to the bridge circuit between the rectifiers and between the resistances respectively, and a connection between the output and the amplifier.

12. In an electrical control circuit of the charactr described, in combination, a D. C. control source, and a modulator comprising a balanced bridge circuit including two varistors connected in series, an A. C. impedance which will pass D. C. connected at a point between the varistors, one D. C. lead being connected to the impedance, the other D. C. lead being connected to the opposite point of the balanced bridge circuit, and means for cyclically varying the incremental resistance of the varistors to provide an A. C. output taken from the common point between the impedance and the two rectifiers and the opposite point of the bridge circuit whereby an A. C. current is delivered by the modulator.

13. In a circuit of the character described, the combination with a constant A. C. power source, a variable D. C. control source and an A. C. amplifier, of a modulator circuit comprising a bridge circuit having two varistors connected in series between the A. C. power leads, two resistances connected in series with each other and in parallel with the varistors between the A. C. power leads, an A. C. impedance which passes D. C. connected to the common point between the varistors, one D. C. lead being connected to the impedance and through it to the varistors, the other D. C. lead being connected to the common point between the two resistances, said point being effectively grounded for the A. C. power frequency either directly or by means of a capacitor, and an A. C. connection from the common point between the varistors serving as the output terminal to the amplifier, provision being made for suppressing one half cycle of the A. C. voltage at the bridge circuit.

ROBERT FRED HAYS, Jr.

REFERENCES CITED

The following references are of record in the file of this patent:

UNITED STATES PATENTS

| Number | Name | Date |
| --- | --- | --- |
| 2,414,317 | Middel | Jan. 14, 1947 |